US012391843B2

(12) United States Patent
Dalton et al.

(10) Patent No.: US 12,391,843 B2
(45) Date of Patent: Aug. 19, 2025

(54) CARBON-BASED CONDUCTING INKS

(71) Applicant: ADVANCED MATERIAL DEVELOPMENT LIMITED, Guildford (GB)

(72) Inventors: Alan Dalton, Guildford (GB); Matthew Large, Guildford (GB); Sean Ogilvie, Guildford (GB); James Johnstone, Guildford (GB)

(73) Assignee: ADVANCED MATERIAL DEVELOPMENT LIMITED, Guildford (GB)

( * ) Notice: Subject to any disclaimer, the term of this patent is extended or adjusted under 35 U.S.C. 154(b) by 0 days.

(21) Appl. No.: 17/908,189

(22) PCT Filed: Mar. 4, 2021

(86) PCT No.: PCT/EP2021/055458
§ 371 (c)(1),
(2) Date: Aug. 30, 2022

(87) PCT Pub. No.: WO2021/175989
PCT Pub. Date: Sep. 10, 2021

(65) Prior Publication Data
US 2023/0142469 A1 May 11, 2023

(30) Foreign Application Priority Data
Mar. 5, 2020 (EP) .................................... 20161263

(51) Int. Cl.
*C09D 11/52* (2014.01)
*C01B 32/19* (2017.01)
(Continued)

(52) U.S. Cl.
CPC .............. *C09D 11/52* (2013.01); *C01B 32/19* (2017.08); *C01B 32/225* (2017.08);
(Continued)

(58) Field of Classification Search
CPC .................................................... C01B 32/158
See application file for complete search history.

(56) References Cited

U.S. PATENT DOCUMENTS

| 2010/0136341 A1 | 6/2010 | Kirkor et al. |
| 2012/0017249 A1 | 1/2012 | Ozawa |

(Continued)

FOREIGN PATENT DOCUMENTS

| CN | 108641486 A | 10/2018 |
| CN | 111876025 A | 11/2020 |

(Continued)

OTHER PUBLICATIONS

International Search Report for PCT/EP2021/055458, dated Jun. 8, 2021, 14 pages.
(Continued)

*Primary Examiner* — Ian A Rummel
(74) *Attorney, Agent, or Firm* — Casimir Jones, S.C.; Robert A. Goetz

(57) ABSTRACT

The invention provides liquid compositions comprising conductive carbon particles and/or carbon nanoparticles, a thickening agent, and a solvent. The carbon nanoparticles are preferably a mixture of graphite nanoplatelets and carbon nanotubes and the thickening agent is preferably a cellulose derivative. The liquid compositions can be used as ink to print highly conductive films that adhere to paper substrates.

14 Claims, 9 Drawing Sheets

(51) Int. Cl.
| | |
|---|---|
| C01B 32/225 | (2017.01) |
| C09D 11/033 | (2014.01) |
| C09D 11/037 | (2014.01) |
| C09D 11/14 | (2006.01) |
| G06K 19/077 | (2006.01) |
| H01Q 1/22 | (2006.01) |
| H05B 3/14 | (2006.01) |

(52) U.S. Cl.
CPC .......... *C09D 11/033* (2013.01); *C09D 11/037* (2013.01); *C09D 11/14* (2013.01); *G06K 19/07773* (2013.01); *H01Q 1/2225* (2013.01); *H05B 3/145* (2013.01); *C01B 2204/22* (2013.01); *H05B 2203/017* (2013.01); *H05B 2214/04* (2013.01)

(56) References Cited

U.S. PATENT DOCUMENTS

| | | | |
|---|---|---|---|
| 2014/0212656 A1 | 7/2014 | Rudhardt et al. | |
| 2014/0345843 A1 | 11/2014 | Kirkor et al. | |
| 2016/0276056 A1 | 9/2016 | Stolyarov et al. | |
| 2018/0028256 A1 | 2/2018 | Ballakur et al. | |
| 2018/0057701 A1* | 3/2018 | Kubota | C09D 11/322 |
| 2018/0327618 A1* | 11/2018 | McManus | C09D 11/30 |

FOREIGN PATENT DOCUMENTS

| | | |
|---|---|---|
| CN | 107163686 B | 1/2021 |
| EP | 1832632 A1 | 9/2007 |
| EP | 3591012 A1 | 1/2020 |
| JP | 2015-185309 A | 10/2015 |
| WO | 2013/074709 A1 | 5/2013 |

OTHER PUBLICATIONS

EPO Search Report, EP Patent Application No. 20161263.7, dated Oct. 2, 2020, 8 pages.

Khan et al., "The preparation of hybrid films of carbon nanotubes and non-graphite/graphene with excellent mechanical and electrical properties", Carbon, (2010), 48, pp. 2825-2830.

Shim et al., "Optimally conductive networks in randomly dispersed CNT:graphene hybrids", Nature Scientific Reports | 5:16568 | DOI: 10.1038/srep16568 10 pages, Nov. 13, 2015.

Office Action, CN Patent Application No. 202180017332.9, mailed Apr. 18, 2024, 12 pages.

Zhu Xiaoyun et al., "Preparation Technology and Application of Non-ferrous Metal Special Functional Powder Materials", Metallurgy Industrial Press (2011), pp. 384-386.

\* cited by examiner

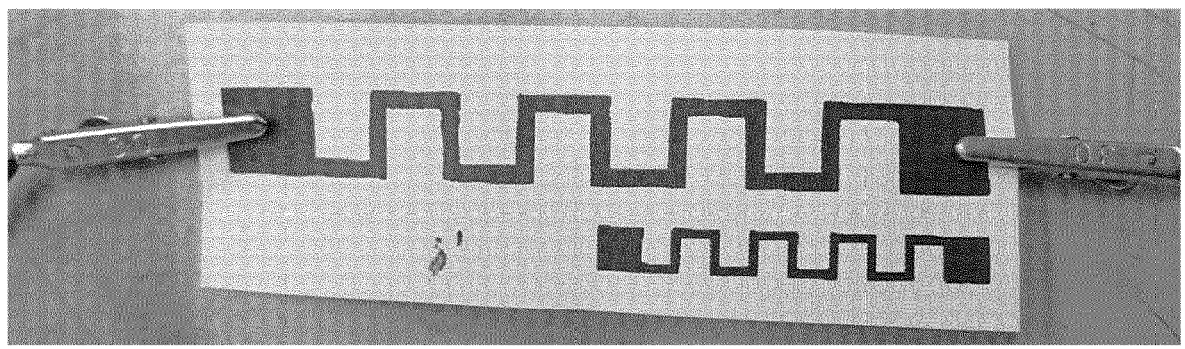
Figure 11
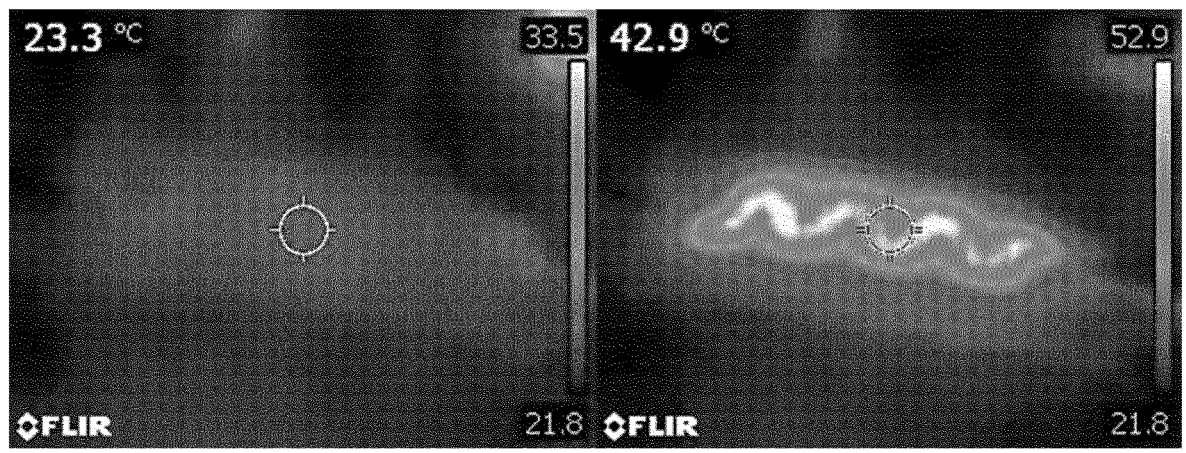
Figure 12A                                      Figure 12B

CARBON-BASED CONDUCTING INKS

This present invention relates to conducting inks containing carbon nanomaterials, methods of making such inks, their applications, as well as substrates onto which the conducting inks have been printed.

BACKGROUND TO THE INVENTION

Two-dimensional (2D) materials are crystalline materials consisting of a few layers or even just a single layer (monolayer) of atoms or molecules. A wide range of 2D materials are known and include graphene, hexagonal boron nitride (h-BN), and transition metal dichalcogenides (TMDs). TMDs have the formula $MX_2$, wherein M is a transition metal and X is a chalcogen atom (S, Se or Te). Examples of such TMDs include molybdenum disulphide ($MoS_2$), niobium diselenide ($NbSe_2$) and tungsten disulphide ($WS_2$).

2D materials are known to have many interesting and potentially useful properties, which differ from the properties of the corresponding bulk 3D material. For example, graphene is highly conductive and has applications in electrode structures as well as in conductive composites.

The interesting functional properties of many materials are often only observed when the materials are in their mono- or few-layer (i.e. 2D) forms. However, strong interlayer dispersion forces must be overcome in order to exfoliate bulk three-dimensional (3D) materials to form the corresponding 2D materials.

Carbon nanotubes are nanosized tubes constructed from rolled sheets of graphene. The tubes typically have a diameter in the range of 1 to 50 nanometres but can have lengths in the micrometre range. Carbon nanotubes can be either single-walled (i.e. formed from a single rolled sheet of graphene) or multi-walled (i.e. formed from a plurality of concentric rolled sheets of graphene). Carbon nanotubes have attracted great interest due to their physical properties—namely their high tensile strength and high electrical conductivity.

Liquid dispersions containing carbon nanomaterials (e.g. carbon nanotubes, carbon nano-graphite, graphene and mixtures thereof) have been considered as inks that can be used to deposit conductive films. Such films have the advantage that they would be "metal-free" for certain commercial applications, but nevertheless conductive. However, to date the use of such inks has been limited to the low conductivity of the printed films. For example, while copper has a conductivity in the range of $6 \times 10^7$ S/m, reported films produced from carbon nanomaterials typically have conductivities of much less than 100 S/m (see U.S. Pat. No. 10,244,628). Further, the printed carbon-containing inks that do exist are printable only onto a limited range of substrates such as aluminium and plastic (poly-ethylene terephthalate (PET) in particular). These substrates are not recyclable.

Formation of printable inks based on dispersions of carbon nanomaterials in water have suffered from flocculation issues due to the non-polar nature of these materials. This reduces industrial application due to settlement of nanocarbon materials and the need for excess organic solvents.

Khan et al., "The preparation of hybrid films of carbon nanotubes and nano-graphite/graphene with excellent mechanical and electrical properties", Carbon 48 (2010), pp. 2825-2830 describes hybrid films containing both carbon nanotubes and nano-graphite that possess greater electrical conductivities than films containing each component alone. However, Khan et al only describe dispersions of nano-graphite and carbon nanotubes in an N-methyl pyrrolidone solvent. The solvent is removed via vacuum filtration to form a film of the carbon nanomaterials. The conductivity of the films is only up to $2 \times 10^4$ S/m and this liquid formulation is not suitable for printing.

Pan et al., "Sustainable production of highly conductive multilayer graphene ink for wireless connectivity and IoT applications", Nature Comm. (2018), 9:5197, describes inks containing graphene, dihydrolevoglucosenone and NMP. Films printed from these inks exhibited conductivities of only $7.13 \times 10^4$ S/m.

Ferrari et al (WO2017/060497A1), describe the production of liquid phase exfoliated GNP/carboxy methyl cellulose films which exhibited a conductivity of $7.14 \times 10^4$ S/m. These films were printed onto PET substrates and used for the fabrication of UHF RFID tag with a read range of 1.4 m at 2 W of incident radiation.

Ecological recycling of mixed material objects is an enduring challenge especially within the electronics industry. Implementing electronic systems which are less detrimental to the environment stimulates new innovations in the combinations of materials which are used to produce these devices. Mass produced UHF RFID tags are composed of mixed materials (plastic, metal, silicon and paper). Moving towards materials which have increased ecological credentials and acceptable performance is of interest to many stakeholders. In some instances, metal is not preferred due to strict requirements for screening of goods for protection of consumer interests.

High solids content inks are essential requisites to reduce the environmental burden of printing through the drying process. Stabilising nanocarbon dispersions using cooperative binders increases the potential thickness of screen-printed films. This serves to reduce resistive losses which are essential for various printed electronic applications. For efficient carbon based RF antenna applications should be less than the printed film thickness, typically limited to <100 µm by process and ink solids content consideration (Jordan, Edward Conrad (1968), Electromagnetic Waves and Radiating Systems, Prentice Hall, ISBN 978-0-13-249995-8).

There is still the need for alternative constructions based on carbon-based conducting inks alternative, preferably with improved electrical conductivity and/or that can be printed onto recyclable substrates.

SUMMARY OF THE INVENTION

The inventors of the present application have found that printable inks containing graphite nanoplatelets or graphite particles and single walled carbon nanotubes have very high electrical conductivities (up to $5 \times 10^5$ kS/m, see Examples 2 and 6). Such inks can be used in a wide variety of applications including in the production of "metal-free" antennas for RFID tags and printed heaters.

Accordingly, in a first aspect, the invention provides a liquid composition comprising:
(i) carbon nanomaterials;
(ii) a thickening agent; and
(iii) a solvent.

The thickening agent may suitably bind the carbon nanomaterials and adhere a substrate, for example a cellulose based or other suitable hydrophilic substrate. The thickening agent may be or comprise a cellulose derivative. The inventors have also found that carbon nanomaterial-containing inks can be prepared that can be printed onto and adhere to recyclable substrates, especially paper.

The compositions may comprise carbon nanotubes as the or one of the carbon nanomaterials. The compositions may also comprise conductive carbon particles. Preferably, the compositions comprise a mixture of carbon nanotubes together with a further conductive carbon particle.

Accordingly, in a second aspect, the invention provides a liquid composition comprising:
(i) conductive carbon particles;
(ii) carbon nanotubes;
(iii) a thickening agent; and
(iv) a solvent.

The thickening agent suitably separates and encapsulates the carbon nanotubes to provide a means of dispersion for a maximum number of individual conductive pathways between the nanotubes and the conductive carbon particles.

In some embodiment, the conductive carbon particles are graphite particles, e.g. micron-sized graphite particles.

In another embodiment, the conductive carbon particles are graphite nanoplatelet particles. The inventors have advantageously found that when the carbon nanomaterials are a mixture of graphite nanoplatelets and single-walled carbon nanotubes and the thickening agent is a cellulose derivative, films printed from these liquid ink compositions possess high electrical conductivities.

Accordingly, in a third aspect the invention provides a liquid composition comprising;
(i) graphite nanoplatelets;
(ii) carbon nanotubes;
(iii) a cellulose derivative; and
(iv) a solvent.

The liquid compositions (once printed) dry to form an electrically conductive film which can adhere to cellulose-containing substrates. When the solvent is an aqueous solvent, due to the nature of interaction between the cellulose derivative thickening agent and the solvent, the compositions may also be correctly referred as hydrogel inks. Herein, reference to liquid compositions of the invention embraces hydrogel inks unless the context demands otherwise.

The above liquid compositions may also be provided in a dry-powder or aerogel composition, where the solvent is absent.

In a further aspect of the invention there is provided a substrate (for example a cellulose-based substrate) onto which a conducting ink has been printed, the conducting ink comprising:
(i) conductive carbon particles (for example carbon nanomaterials); and
(ii) a binding agent that binds to cellulose, suitably a cellulose derivative.

The invention also provides a method of printing a conducting ink onto a substrate (for example, a cellulose-based substrate), the conducting ink comprising:
i) conductive carbon particles (for example carbon nanomaterials);
ii) a cellulose derivative; and
iii) a solvent.

It has also been shown that the liquid compositions described herein can be printed onto stretchable substrates. Compositions described in further details herein which can be printed onto stretchable substrates are also provided.

As described above, the inks may also comprise carbon nanotubes and may also comprise graphite particles as the conductive carbon particles. Similar improvements in conductivity have been observed with graphite particles as with graphite nanoplatelets (see Example 6 below).

Compared to the films described in WO 2017/060497, the present invention has the significant improvements of having higher overall film conductivity up to $5\times10^5$ S m$^{-1}$ with the addition of carbon nanotubes. It has also been shown that films printed according to the present invention can be printed on common cellulose-based substrates (e.g. paper) and stretchable substrates with good film-forming and stability characteristics.

The concentration of the ink solids content and use of screen printing also promotes thick film formation necessary to achieve good conductivity (0.1 Ohm/Sq/mil), giving the films suitable antenna characteristics and the necessary electromagnetic 'skin depth' characteristics required for radiative antenna within the UHF band.

The printing of conductive structures on substrates enables a range of applications to be realised via the integration of surface mounted electronic components. Examples of potential commercial applications such as RFID tags, microheaters and sensors are described.

DETAILED DESCRIPTION OF THE INVENTION

The term conductive carbon particles refers to particles that comprise carbon and which are electrically conductive, for example have an electrical conductivity of 750 S/m or greater, for example 1000 S/m or greater.

The conductive carbon particles typically comprise greater than 80% by weight of carbon, preferably greater than 90% by weight of carbon, for example greater than 95% by weight of carbon. In some compositions described herein, the conductive carbon particles consist of carbon (i.e. contain carbon and no other element, to a significant extent).

As mentioned above, the conductive carbon particles are electrically conductive. Therefore, the proportion of carbon atoms in the conductive carbon particles in an sp$^2$ hybridisation state is typically 50% or greater, for example 75% or greater, preferably 90% or greater.

Examples of conductive carbon particles include graphite and graphene (e.g. graphite nanoplatelets). Accordingly, the average particle size may be micron-scale or nanoscale respectively.

When the conductive carbon particles (e.g. the graphite particles) are micron-scale, they typically have dimensions of 1 μm or greater, for example 2 μm or greater or 3 μm or greater in all three-dimensions (length, width and thickness). However, the micron-scale conductive carbon particles typically have a longest dimension of 50 μm or less, typically 30 μm or less, for example 25 μm or less or 20 μm or less.

The term "carbon nanomaterials" as used herein refers to nanomaterials (i.e. materials having one critical dimension an average size from 1 nm to 100 nm) that comprise or consist of carbon. Typically, the carbon nanomaterials comprise at least 90% or more by weight, preferably at least 95% or more by weight, for example 99% or more by weight of carbon. The term includes materials such as graphene, graphite nanoplatelets, single-walled carbon nanotubes, multi-walled carbon nanotubes, crystalline diamond, and diamond-like carbon (see ISO standard ISO/TS 80004-3: 2010). Typically, the carbon nanomaterials are electrically conductive carbon nanomaterials. Preferably the carbon nanomaterials comprise a mixture of (i) graphene nanoplatelets and (ii) single-walled carbon nanotubes, multi-walled carbon nanotubes, or both. In particular the carbon nanomaterials preferably comprise a mixture of (i) graphite nanoplatelets, and (ii) single-walled carbon nanotubes. The dimensions of nanomaterials can be determined by transmission electron microscopy.

It has been found that a cooperative effect with respect to conductivity exists in compositions containing both graphite particles or graphite nanoplatelets and single-walled carbon nanotubes. Without wishing to be bound by theory, it is thought that the carbon nanotubes provide a conductive bridge between individual graphite particles or graphite nanoplatelets and thus reduce the "patch resistance" of individual nanoplatelets/particles. Patch resistance is caused by the finite tunnelling of electrons between adjacent sheets which is much higher than movements within the internal structure of the sheets (in graphite) or rods (in carbon nanotubes). In addition, without wishing to be bound by theory, the inventors believe that the junction resistance between a graphite nanoplatelet or particle and a carbon nanotube is lower than the junction resistance between two nanoplatelets/particles or two nanotubes. Therefore, intimate mixing of the nanoplatelets/graphite particles and nanotubes results in an improved conductivity of films formed from the liquid compositions described herein comprising both graphite nanoplatelets/particles and carbon nanotubes (specifically single-walled carbon nanotubes).

To maximise this effect, the carbon nanotubes are preferably individualised. Typically, greater than 75%, for example greater than 80%, preferably greater than 85% of the carbon nanotubes by weight of the nanotubes within the composition are individualised. Individualised nanotubes can be seen in FIGS. 1 and 2. The degree of individualisation of nanotubes can be determined from UV-Vis spectroscopy, as individualised single-walled carbon nanotubes show Van Hove singularities (peaks) at specific wavelengths (Alafogianni et al., Colloids and Surfaces A: Physicochemical and Engineering Aspects, Vol 495, (2006), pp. 118-124). These UV-Vis absorptions are not visible for bundled carbon nanotubes, and so the prominence of these peaks gives a measure of exfoliation/individualisation.

The packing of different non-soluble geometric shapes and size particles can lead to a diverse range of physical properties enhancements depending on the nature of those particles. This effect is also prevalent down into the nanoscale. Through careful combination of different particle sizes and geometries, it is possible to tune the overall physico-chemical properties of formulated systems to achieve desired characteristics. In commercial applications, cost factors of the most active elements often require the system to be filled with a significant fraction (>50%) of lower cost filler materials that do not affect performance to an unacceptable level or are added to impart another property such as thermal conductivity, mechanical strength and/or chemical reactivity. In this invention, concentration of the most conductive hydrogel elements within the packing voids within a matrix of larger conductive carbon particles (which may exhibit one dimension at the nanoscale) enables cost-effective formulations to be derived. The blending of thixotropic single wall carbon nanotube hydrogels with conductive carbon particles ensures that high conductivity is maintained throughout the printing and drying process resulting in superior film conductivities.

The term "graphite nanoplatelets" as used herein (also referred to herein as "graphene nanoplatelets") refers to nanoparticles of graphite which consist of small stacks of a graphene. The term "few-layer" nanoplatelets refers to nanoplatelets having on average 20 or fewer layers, typically 15 layers or fewer, preferably 10 or fewer layers. Layer numbers can be determined by UV-vis spectroscopy (see C. Backes et al., 'Spectroscopic metrics allow in-situ measurement of mean size and thickness of liquid-exfoliated graphene nanosheets', Nanoscale, 2016, doi: 10.1039/C5NR08047A).

The nanoplatelets typically have an average thickness of less than 30 nm, for example less than 20 nm. The term "thickness" as used herein refers to the dimension of the nanoplatelets along the axis of stacking of the layers within the nanoplatelets. The terms "length" and "width" refer to the longer and shorter dimensions of the nanoplatelets along perpendicular axes in the plane of the sheets of the layered materials respectively (see FIG. 14). The nanoplatelets typically have an average length and/or width of 30 nm or greater, preferably 50 nm or greater or 100 nm or greater. The nanoplatelets typically have an average length and/or width of 3.0 µm or less, for example 2.0 µm or less, typically 1.5 µm or less, preferably 1 µm or less, for example 800 nm or less. The dimensions of the nanoplatelets can be measured using scanning or transmission electron microscopy. By contrast to the micron-sized particles described above, which are micron-sized in three dimensions (i.e. have a length, width and thickness all of 1 µm or greater), the nanoplatelets are typically only micron-sized in two dimensions (i.e. their length and width, with their thickness being significantly less than 1 µm, for example less than 100 nm). As mentioned above, these dimensions can be measured by transmission electron microscopy.

When the conductive carbon particles comprise graphite nanoplatelets, the graphite nanoplatelets are typically present in the liquid composition in an amount of from 0.5% (w/w), preferably from 0.75%, for example from 1% and up to 5% (w/w), preferably up to 3% (w/w), for example up to 2% (w/w). When the liquid composition has dried to form a dry film/powder, the graphite nanoplatelets are typically present in an amount of from 25% (w/w), preferably from 30% (w/w), for example from 35% (w/w) and/or up to 50% (w/w), preferably up to 45% (w/w), for example up to 40% (w/w).

When the conductive carbon particles comprise micron-sized graphite particles, the graphite particles are typically present in the liquid composition in an amount of 0.5%, for example from 1% and up to 5% (w/w), preferably up to 3% (w/w), for example up to 2% (w/w). When the liquid composition has dried to form a dry film/powder, the graphite particles are typically present in an amount of from 30% (w/w), preferably from 40% (w/w) and up to 70% (w/w), preferably up to 55% (w/w), for example up to 60% (w/w).

The carbon nanotubes may be single-walled carbon nanotubes or multi-walled carbon nanotubes, but preferably comprise or consist of single-walled carbon nanotubes. The carbon nanotubes typically have an outer mean diameter of from 1 nm to 5 nm, preferably from 1 nm to 2 nm (as determined by transmission electron microscopy) and may have a length of greater than 3 µm, typically greater than 5 µm, for example greater than 10 µm or greater than 15 µm. Whereas the micron-sized particles described above are micron-sized in three dimensions and the nanoplatelets are micron-sized in two dimensions, the carbon nanotubes are only micron-sized in a single dimension (i.e. along their length).

The carbon nanotubes may be present in the compositions described herein in a weight ratio relative to the amount of graphite nanoplatelets or graphite particles of greater than 0.05:1 (carbon nanotubes:graphite nanoplatelets/particles), for example greater than 0.10:1 or 0.15:1, preferably greater than 0.2:1 and in a ratio of up to 1:1, suitably up to 0.75:1 or up to 0.5:1, for example up to 0.4:1 or up to 0.35:1.

For example, when the conductive carbon particles are graphite nanoplatelets, the carbon nanotubes are typically present in the formulations in a weight ratio relative to the amount of graphite nanoplatelets of from 0.15:1 to 0.7:1 (carbon nanotubes:graphite nanoplatelets), preferably in a ratio of from 0.2:1 to 0.6:1.

Alternatively, when the conductive carbon particles are micron-sized graphite particles, the carbon nanotubes are typically present in the formulations in a weight ratio relative to the amount of graphite particles of from 0.02:1 to 0.2:1 (carbon nanotubes:graphite particles), preferably in a ratio of from 0.05:1 to 0.15:1.

Alternatively, the quantity of carbon nanotubes in the compositions may be defined relative to the weight of the total composition. For example, the carbon nanotubes may be present in the liquid composition in an amount of from 0.1% (w/w), preferably from 0.25%, for example from 5% and up to 1.5% (w/w), preferably up to 1.25% (w/w), for example up to 1% (w/w). When the liquid composition has dried to form a dry film/powder, the carbon nanotubes are typically present in an amount of from 5% (w/w), preferably from 10% (w/w), for example from 15% (w/w) and up to 30% (w/w), preferably up to 25% (w/w), for example up to 20% (w/w).

The solvent may be an aqueous or non-aqueous solvent. However, the solvent preferably is or comprises water (necessary for hydrogel formation). Alternatively, the solvent may be a dipolar aprotic solvent. Examples of such dipolar aprotic solvents include cyclopentanone, cyclohexanone, N-methylpyrrolidone (NMP), dimethylformamide (DMF), dimethylsulphoxide (DMSO), dimethylacetamide (DMAc), sulpholane, dihydrolevoglucosenone (Cyrene) and lactones, such as gamma-valerolactone. It has been found that a solvent system comprising a combination of water and gamma-valerolactone results in an ink which is suitable for printing onto stretchable substrates (see Example 4 below).

The compositions may also include a thickening agent (which may also act as gelification agents) to increase the viscosity of the compositions. The increased viscosity ensures that the compositions are suitable for printing and also reduces tendency of the carbon nanomaterials to flocculate.

The thickening agent is preferably a hydrogel-forming thickening agent. As discussed above, the formation of a hydrogel matrix containing carbon nanotubes and conductive carbon particles results in a highly conductive ink. The hydrogel-forming thickening agents are generally hydrophilic polymer chains which form a colloidal gel through extensive hydrogen-bonding networks in water.

The thickening agents also preferably bind to cellulose, for example when an ink/liquid composition of the invention is printed onto and dries on a cellulose-containing substrate (such as paper).

Examples of suitable thickening agents include:
cellulose derivatives, such as carboxymethyl cellulose (CMC), methyl cellulose, hydroxy ethyl cellulose and carboxy ethyl cellulose, and salts thereof (such as sodium salts thereof);
polymers such as polyethylene oxide (PEO), polypropylene oxide (PPO);
polyanaline (PANI), polyvinylpyrrolidone (PVP), polyvinyl alcohol (PVA) and poly N-isopropylacrylamide (PNIPAAm);
cyclodextrins;
natural gelification agents such as xanthan gum, gelatine, glycerol, alginates, chitosan;
inorganic silicas and clays such as bentonite, montmorillonites, laponite, nano-silica and titania; and
filamentous or rod-like materials, for example those having an aspect ratio of greater than 100 (e.g. carbon nanotubes).

In a preferred embodiment, the thickening agent is a cellulose derivative, such as carboxymethyl cellulose. The term cellulose derivate as used herein refers to chemical derivatives of cellulose formed by functionalisation of some or all of the hydroxyl groups presence in cellulose (for example via etherification or esterification reactions). Derivatives can be formed by incorporation of one or more or all of carboxy, hydroxy, methyl, ethyl and/or propyl groups. Examples of cellulose derivatives include hydroxypropylmethylcellulose, hydroxypropylcellulose, methylethylcellulose, methylcellulose and carboxymethylcellulose or a combination thereof, as well as cellulose itself. It has been found that liquid ink compositions containing this type of binder advantageous adhere to paper substrates. CMC is available in several forms (e.g. varying by degree of substitution and function) and can be crosslinked with several chemical agents either covalently or through hydrogen bonding networks with other agents to impart new properties which can be tailored according to requirements (Gels 2018, 4, 54; doi:10.3390/gels4020054).

Cellulose derivatives readily form hydrogels which are utilised in many industrial applications. These materials may also act as surface active agents which stabilise nanocarbon materials in aqueous solvents. Hydrogels exhibit ideal thixotropic behaviour due to their extended hydrogen bonding or supramolecular network formation behaviour. These networks serve to provide long range ordering to improve rheological behaviour.

The total concentration of the thickening agents may be in the range of 0.5% to 2% by weight of the total composition (including the solvent), for example from 1% to 1.75% by weight of the total composition.

The thickening agent increases the viscosity of the composition and it is envisaged that it also enables the carbon nanotubes (when present) to form a pre-ordered supramolecular network, which increases the conductivity of films printed from the composition.

The viscosity of the composition is important to ensure that it can be printed to form a film. In addition, the composition should be viscous enough to prevent flocculation of the carbon nanomaterials within the composition. The precise viscosity will of course depend on the application of the composition (and the resulting film). The thickening agent also ensure that the inks have a viscosity suitable for printing, e.g. screen printing. The inks suitable for screen-printing are typically thixotropic and therefore their viscosity is dependent on shear rate. As shown in FIG. 15, the inks may have a viscosity of from 100 to 1000 Pa·s at a shear rate of 0.1/s and/or may have a viscosity of from 1 to 10 at a shear rate of 100/s.

The compositions may also include one or more surfactants. The surfactants are typically non-ionic surfactants. Examples of suitable non-ionic surfactants include polyethylene oxide-based (PEO) surfactants (e.g. Triton X-100), polypropylene oxide-based (PPO) surfactants, cyclodextrins and polyvinyl pyrrolidone (PVP) surfactants. However, ionic surfactants, such sulphate-based surfactants (such as sodium dodecyl sulphate) may also be used.

The total concentration of the surfactants may be in the range of 0.01% to 1% or 0.01% to 0.1% by weight of the total composition (including the solvent), for example from 0.02% to 0.05% by weight of the total composition.

The compositions may also comprise one or more solvents and or adhesives in order to improve adhesion of the dried film (formed by printing the ink) to a substrate. The nature and combinations of adhesives will of course be dependent on the substrate.

The compositions may also comprise one or more cross-linking agents in order to improve the rheological parameters of the ink and/or properties of resulting films. This may include a wide range of functional organic acids or bases such as ascorbic acid. Examples of further cross-linking agents include di- and tri-carboxylic acids, such as glutaric acid and trimesic acid. This crosslinking serves to stabilise films from rapid redissolution and effects of ambient humidity on conductivity.

In addition, the compositions may further comprise a setting agent, which is a material that cures upon exposure to heat or radiation to cure and set the liquid ink compositions into a solid film. These include photocurable monomers or infra-red activated agents, e.g. epoxides (which may undergo ring opening reactions), aldehydes or acids (which may undergo esterification reactions) such as citric acid.

In exemplary embodiments, the invention provides a composition comprising:
(a) graphite nanoplatelets or graphite particles;
(b) carbon nanotubes;
(c) a cellulose derivative;
(d) a surfactant; and
(e) water.

In one embodiment, the invention provides a composition comprising:
(a) graphite nanoplatelets or graphite particles;
(b) carbon nanotubes;
(c) carboxymethylcellulose;
(d) Triton X-100; and
(e) water.

In a further embodiment, the invention provides a composition comprising:
(a) graphite nanoplatelets in a weight range of 0.5% to 3% (w/w);
(b) carbon nanotubes in a weight range of 0.1% to 1.5% (w/w);
(c) carboxymethylcellulose in a weight range of 0.5% to 2% (w/w);
(d) Triton X-100 in a weight range of 0.01% to 0.1%; and
(e) water.

In yet a further embodiment, the invention provides a composition comprising:
(a) graphite nanoplatelets or graphite particles;
(b) carbon nanotubes;
(c) carboxymethylcellulose;
(d) Gamma-valerolactone;
(e) Triton X-100; and
(f) water.

In a further embodiment, the invention provides a composition comprising:
(a) graphite nanoplatelets in a weight range of 0.5% to 3% (w/w);
(b) carbon nanotubes in a weight range of 0.1% to 1.5% (w/w);
(c) carboxymethylcellulose in a weight range of 0.5% to 2% (w/w);
(d) Gamma-valerolactone in a weight range of 3% to 7% (w/w);
(e) Triton X-100 in a weight range of 0.01% to 0.1%; and
(f) water.

A preferred component of the liquid composition is, as described elsewhere, a cellulose derivative. Ethylcellulose, methylcellulose, hydroxypropylcellulose, carboxymethylcellulose and hydroxyethylcellulose are suitable. Carboxymethylcellulose (CMC) and its derivatives are especially suitable. A salt of carboxymethyl cellulose, for example the sodium salt, may also be used.

In testing of the invention, CMC has been found to provide the compositions with strong binding affinity for cellulosic materials such as paper and card, and is anticipated similarly to bind to cotton, making it ideal for these substrates. In use, CMC formed a stable hydrogel with water and provided a printable, highly conducting ink that adhered to paper.

In a further aspect, the invention provides a method of making an ink, the method comprising:
(i) obtaining exfoliated graphite nanoplatelets;
(ii) obtaining exfoliated single-walled carbon nanotubes; and
(iii) dispersing the exfoliated graphite nanoplatelets, exfoliated single walled-carbon nanotubes, a thickening agent and optionally a surfactant, in a solvent.

To ensure homogenous mixing of the nanoplatelets and carbon nanotubes, the mixture in step iii) may be subjected to a high shear mixing stage. In addition, a further step of compressing (e.g. roll milling) the ink may take place to degas the ink. This facilitates printing of the inks onto substrates.

The compositions described above can be used as inks for printing onto a variety of substrates including flexible polymers (such as polyethylene terephthalates, polypropylenes and polyimides), elastomers (such as silicones and polyurethanes), metallic foils and films (such as aluminium, copper, gold and platinum foils/films) and rigid substrates (such as silicon wafer, glass, quartz and polycarbonates).

In addition to the substrates listed above, the inventors have also surprisingly found that the inks described herein can be printed onto cellulosic substrate materials, such as paper.

Accordingly, in a further aspect of the invention there is provided a substrate (e.g. a cellulose-based substrate) onto which a conducting ink has been printed, the conducting ink comprising:
(i) carbon nanomaterials; and
(ii) a cellulose derivative.

The invention also provides a method of printing a conducting ink onto a substrate (e.g. a cellulose-based substrate), the conducting ink comprising:
(i) carbon nanomaterials; and
(ii) a cellulose derivative.

The conductive inks may comprise carbon nanotubes and graphite particles or graphite nanoplatelets, together with other components, as described above.

The cellulose-based substrate is typically a paper or card.

The inks may be printed using a variety of printing techniques, for example screen printing or inkjet printing.

The ideal behaviour of screen printable inks requires a thixotropic rheology profile such that shear thinning occurs within the printing process and then elastic recovery to stabilise the printed structure at the resolution required for drying or curing. Such behaviour is beneficial for the high resolution printing of lines and interconnects for printed electronic applications. For the construction of an electronic circuit which is amenable to 'bare-die' or unencapsulated silicon components, a print fidelity of typically better than 125 microns maybe preferable for automated die attachment methods.

As described above the carbon nanomaterials may be graphite nanoplatelets, single-walled carbon nanotubes or a mixture thereof and the cellulose-based binder may be carboxymethylcellulose. The films may also contain graphite particles as conductive carbon particles.

The conducting ink may also have additional components or properties as described herein.

This invention combines the high conductivity of nanocarbon material combinations alongside the thixotropic rheology needed for good printing characteristics. Several examples of devices and circuits are presented which exemplifies the suitability towards printed electronic applications. An example of this (Example 3) outlines a UHF RFID Tag. Similarly, (Example 5) exemplifies a microheater device.

The conductive inks can be used for printing in a wide range of applications including, but not limited to, microwave antennas, RFID tags, biosensing electrodes, printed heaters, wireless induction coils, metasurfaces for tunable low emissivity and reflectivity coatings, strain sensors, surface acoustic wave devices, temperature sensors, energy storage electrodes and electrolytes for super capacitors, batteries, capacitive sensors, flexible, stretchable or structural electronic conductors, low density aerogels for catalysis, electrical storage and chemical remediation, self-healing coatings and drug delivery platforms.

In a further aspect, the invention provides an RFID tag comprising an antenna deposited (e.g. printed) from a liquid composition described herein onto a substrate. The substrate may be a plastic polymeric substrate (such as PET) or a cellulosic substrate (such as paper).

In a further aspect, the invention provides a printed heater comprising a heating element printed from a liquid composition described herein onto a substrate.

The measurement of strain on surfaces may be utilised for many industrial applications. Nanocarbon based printed structures exhibit strain dependent conductivity when applied to substrates at or above their percolation threshold. Polymer binder-based films exhibit reproducible elastic properties beyond the used of conductive metals which may break before the elastic limit of the substrate is reached. By utilising the invention therein, the measurement of high strain (>2%) regimes on elastic substrates is enabled with good reproducibility. Furthermore, this elastic behaviour may be extended into the modification of antenna resonance characteristics (frequency and Q factor). A novel example is presented where in the resonant behaviour of printed UHF RF antenna on an elastic substrate can be monitored without need for an internal power source or processing circuit.

In a further aspect, the invention provides a liquid composition deposited described herein deposited (e.g. printed) onto a stretchable substrate.

BRIEF DESCRIPTION OF THE DRAWINGS

FIG. 11 shows a printed film as described in Example 8 for use as a printed heater.

FIGS. 12A and 12B are infrared thermal images of the printed film in FIG. 11 with no potential difference applied (FIG. 12A) and with a potential difference of 10V applied (FIG. 12B) to the film.

EXAMPLES

Example 1—Exfoliation of Graphite to form Graphite Nanoplatelets

Graphite flakes were exfoliated using the apparatus and process described in International Patent Application No. PCT/EP2019/077579 to obtain graphite nanoplatelets with a distribution of lateral sizes of on average approximately 1 μm and an average thickness of approximately 10 layers.

In summary, fine graphite powder (1-50 μm flake sizes produced by air classification of milled powder) was dispersed into a surfactant-water system and added to the inlet reservoir of a high-pressure homogeniser (such as the apparatus described in in International Patent Application No. PCT/EP2019/077579). The fluid was then pressurised and accelerated under decompression before exiting the process cell of the homogeniser into a heat exchanger. Once the fluid was cooled to a temperature maintained by an external chiller system, it is either collected or recirculated, depending on the system configuration.

Once the graphite had been processed, the exfoliated mixture was centrifuged at 5000 g for 20 minutes to remove all unexfoliated crystallites and larger fragments. These parameters sedimented all but the few-layer nanosheets (i.e. the graphite nanoplatelets) present. The graphite nanoplatelets obtained had a distribution of lateral sizes and thicknesses ranging from 50 to 2000 nm and up to ~20 nm respectively.

Example 2—Ink Formulations

The composition is given in the table below for a batch of an ink prepared. The total solids content of the prepared ink (including binders etc.) was approximately 3.7 wt %.

| Material | Mass (g) | Fraction of dry film (wt %) |
|---|---|---|
| Graphite Nanoplatelets (obtained as described in Example 1) | 3.10 | 40 |
| Single Walled Carbon Nanotubes (Tuball Batt-H2O SWCNTs supplied by OCSiAl) | 1.54 | 20 |
| Carboxymethylcellulose (sodium salt) | 2.70 | 34 |
| Triton X-100 | 0.50 | 6 |

To make the ink, the components were weighed into a suitable container. In order to sufficiently lower the viscosity to blend the components, the mixture was heated under mixing (hotplate at 60° C.) using a Silverson L5M-A laboratory high-shear mixer, operating at 5000 rpm. The mixture was then mixed for 5 minutes.

The graphite nanoplatelets have a distribution of lateral sizes of from 50 nm to 800 nm and have thicknesses of up to around 20 nm.

Figure 1:
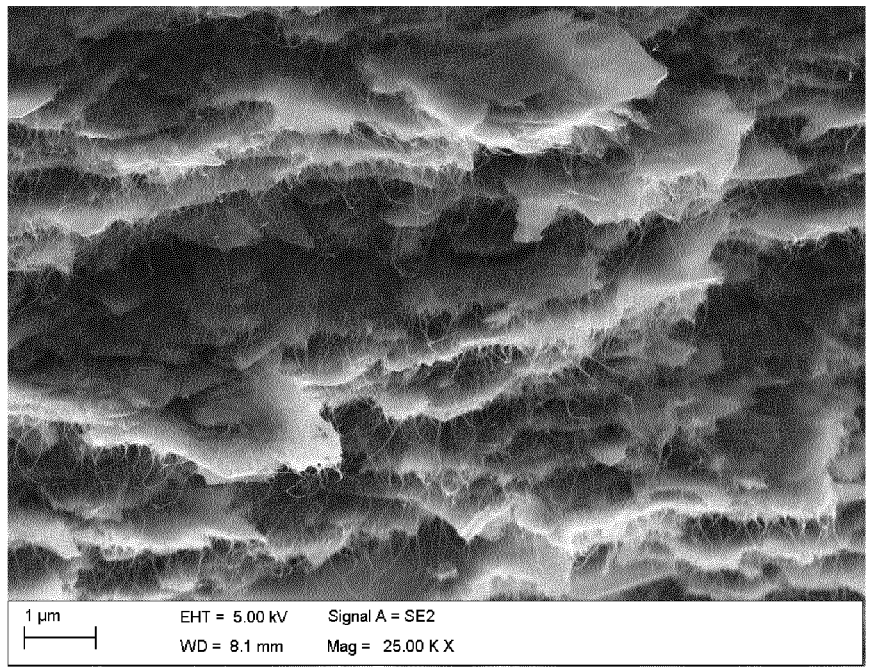
FIGS. 1 and 2 show scanning electron microscopy (SEM) images of the printed inks described in Example 2 below.
Figure 2:
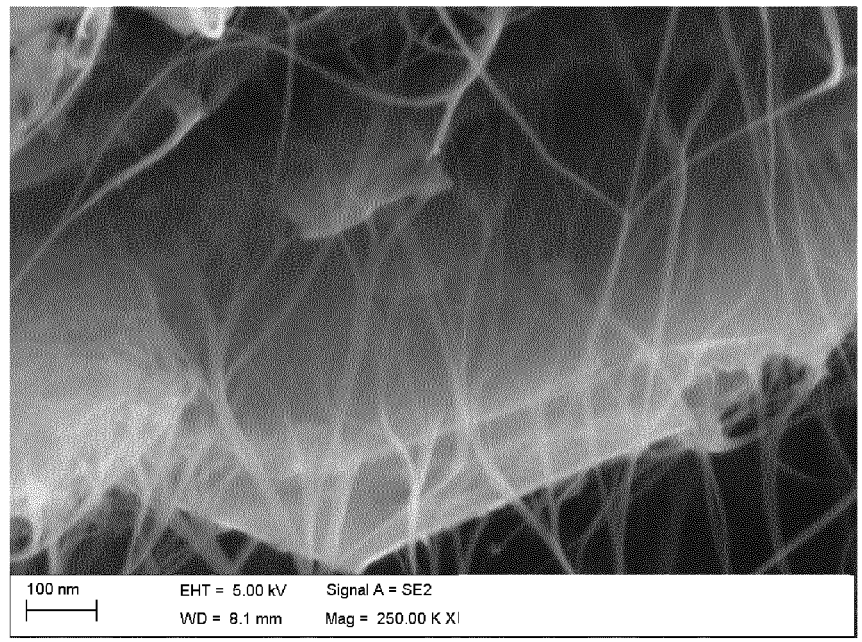

Structural characterisation was performed by SEM, indicating that there is a dense network of carbon nanotubes that exists in the interstitial spaces between packed graphite nanoplatelets (see FIGS. 1 and 2).

Figure 15:
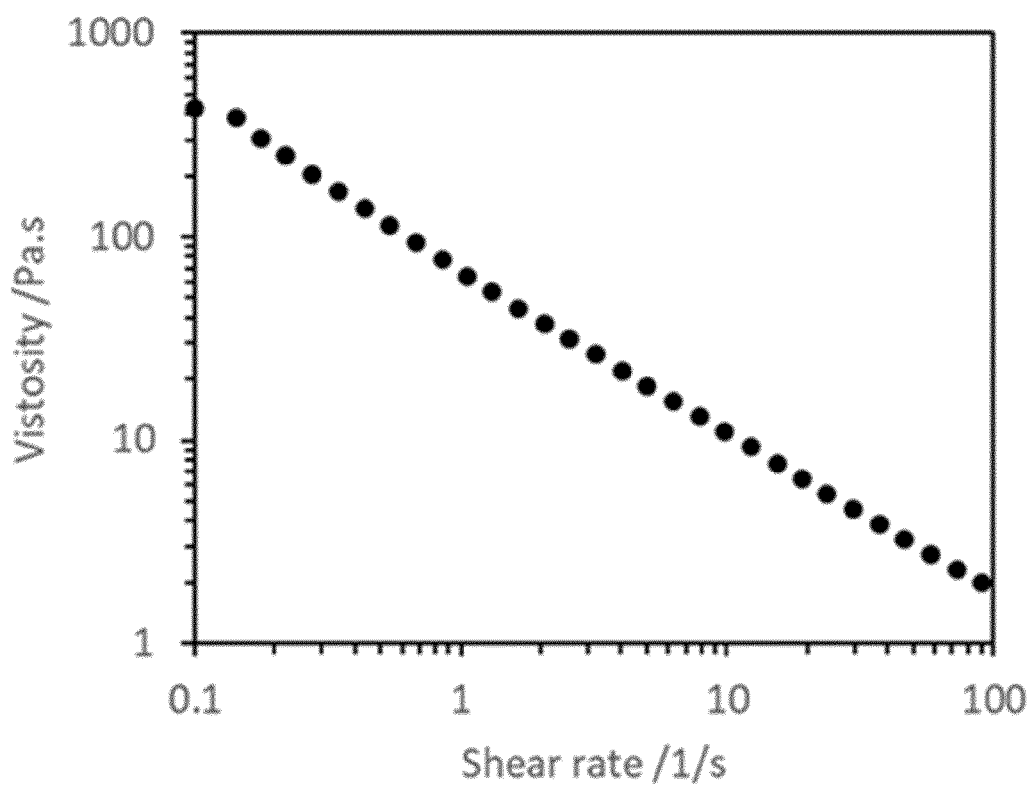
FIG. 15 is a rheology trace showing the viscosity of the inks described in Example 2 below.

The viscosity of the ink was measured over a shear rate of 0.1/s to 100/s. The inks were found to be thixotropic and the rheology trace is shown in FIG. 15.

The inks were successfully printed on a range of substrates including several grades of polyethylene terephthalate (PET) substrate (DuPont Tejin ST504 & Felix Scholler F40100) and paper substrates.

The conductivities of the printed films were measured using a four-point probe, in accordance with International Electrotechnical Commission standard IEC TS 62607-2-1: 2012. The film thickness was measured via SEM cross-sectional analysis or scanning probe profilometry and the conductivity and thickness were used to calculate the specific conductivity.

Conductivities of up to 500 kSm$^{-1}$ were observed for the printed films.

Accordingly, the invention provides highly conductive inks formed from carbon nanomaterials and in particular highly conductive inks formed from carbon nanomaterials that can be printed onto paper substrates.

Example 3: UHF RF Taq Integration

A suitably designed UHF Antenna was screen printed from the ink described in Example 2 above and using 32 T Mesh screen printing to a dry thickness of approximately 3 microns onto a paper-based substrate (standard uncoated label stock).

Figure 3:
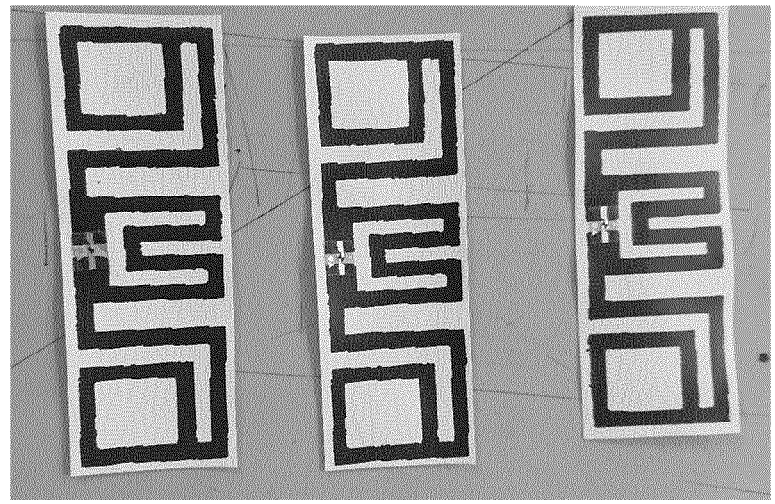
FIG. 3 is a photograph of a printed antenna described in Example 3 below.
Figure 4:
FIG. 4 is a photograph showing the flexibility of the printed antenna shown in FIG. 3.
Figure 5:
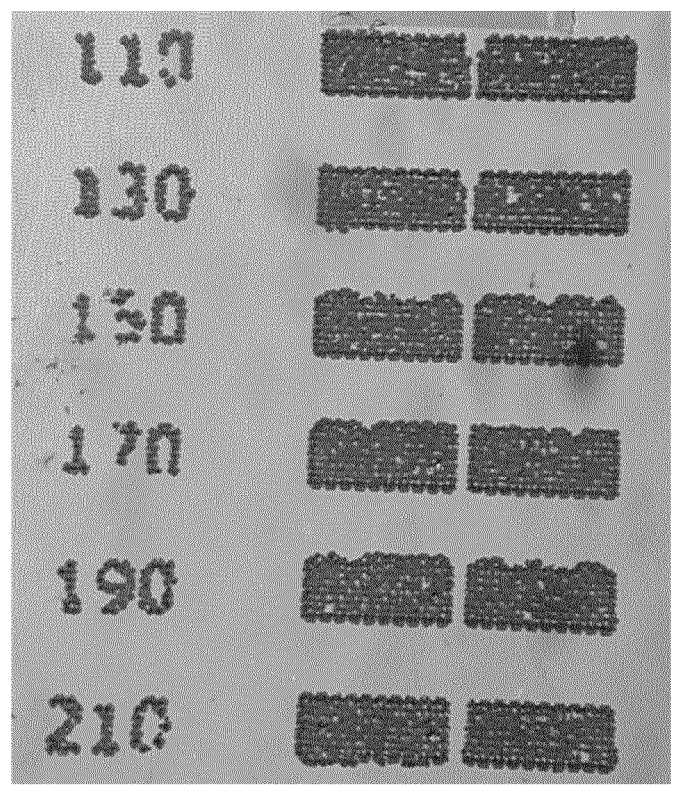
FIG. 5 is a photograph showing the print resolution of the inks described in Example 2 below.

A photograph of the printed antenna is shown in FIG. 3. FIG. 4 shows the flexibility of the printed antenna. It can be seen that the printed antenna can be curled around a narrow diameter without compromising the integrity of the printed antenna. FIG. 5 shows the print resolution of the inks.

The resulting antenna was integrated with a bare-die RFID integrated circuit (Impinj Monza 6 or NXP UCODE 8) via anisotropic conductive film (ACF) thermode process. The resulting RFID Tag was analysed using a handheld Zebra (Model MC3300) reader within an unshielded office environment. The typical read distance achieved was 3 metres.

Example 4: Printing onto Stretchable Substrates

An adhesive agent, Gamma-valerolactone (GVL) was added at 5 wt % to the water content of the ink formulation described in Example 2, during the formulation process.

When printed, the films printed from this GVL-containing ink exhibited a comparable sheet resistance for the same number of print passes as the standard formulation on both PET and paper (e.g. 2-3 Ohm/sq after three print passes).

The GVL-containing inks were also printed onto two different thermoplastic polyurethane (TPU) elastomers as well as a vulcanised polyisoprene rubber.

Linear tracks of the deposited ink on TPU were used to quantify the response of the ink to strain. A linear track was printed onto a dog-bone-shaped substrate that was mounted in a TA Systems Texture Analyser, in order to perform a strain measurement. The sample resistance was monitored in situ using a Keithley 2614B SourceMeter.

Figure 6:
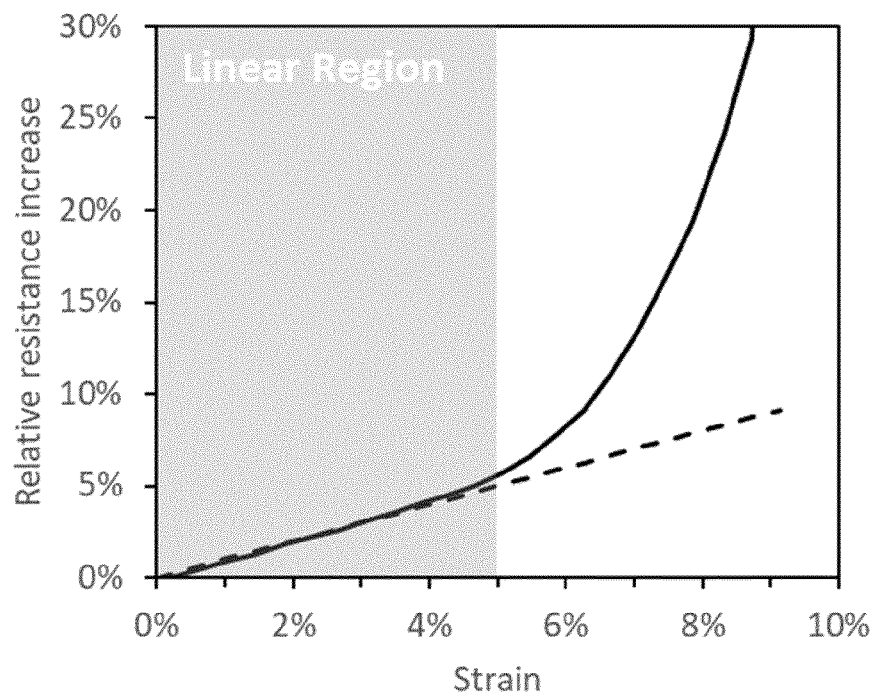
FIG. 6 shows the strain response of resistance of a printed film as described in Example 4.

As shown in FIG. 6, the response of the film resistance is linear up to ~5% strain, after which the resistance begins to rise rapidly. The gradient of the linear region (shown as a dashed line) is unity, which is curious given that most isotropic materials exhibit a Gauge Factor (G) of >2 due to deformation of the material. The mechanism by which this occurs has not yet been identified.

Figure 7:
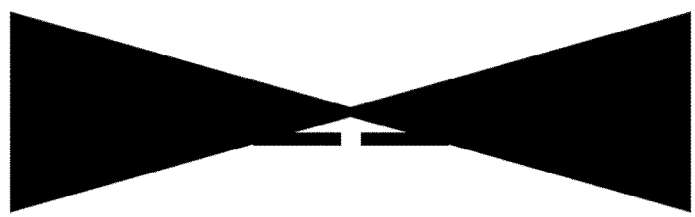
FIG. 7 shows the shape of the antenna pattern printed in Example 4.

A bowtie-shaped antenna pattern (as shown in FIG. 7) was printed using the ink described in GVL-containing ink described above on a commercial TPU elastomeric substrate. The antenna design had been optimised to achieve a resonance within the UHF RFID band (860 to 960 MHz).

The printed antennae shown in FIG. 7, once a suitable RFID integrated circuit (IC) had been attached, had a read distance of approximately 80-85 cm.

Figure 8:
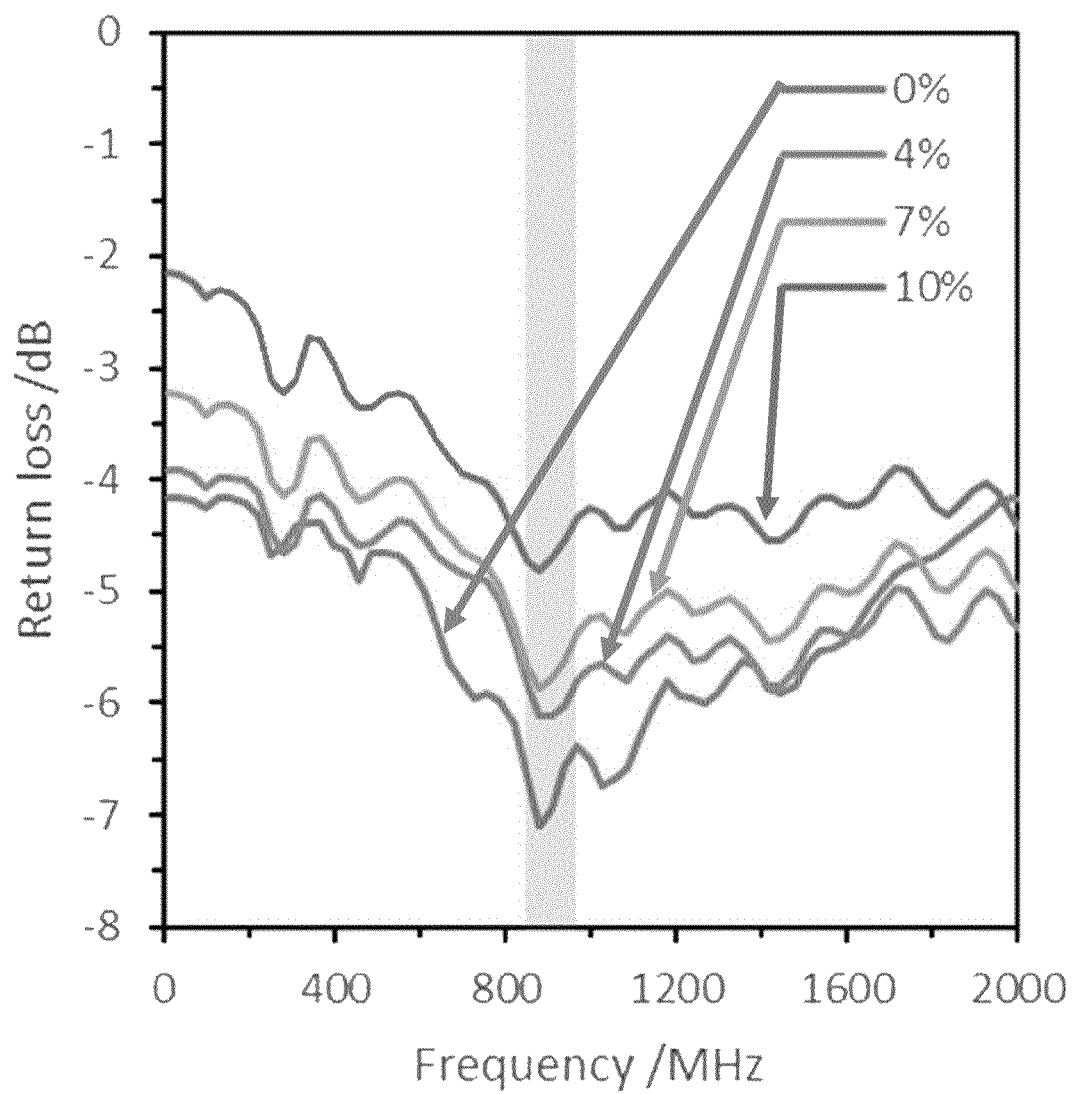
FIG. 8 shows the resonance frequencies of films printed in Example 4 having different GVL contents.
Figure 9:
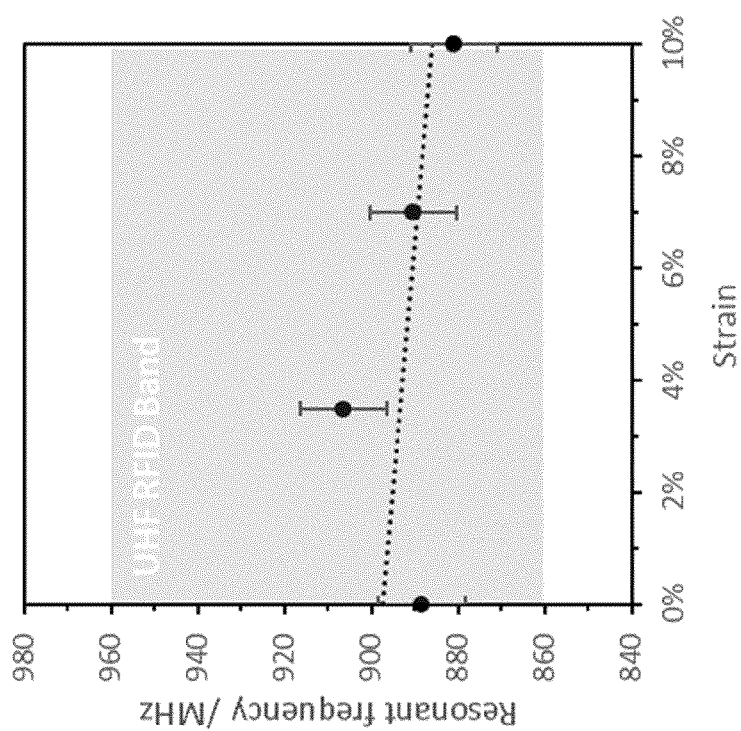
FIG. 9 shows the resonance frequencies of the films described in Example 4 as a function of strain.

In order to compare the antenna behaviour to the resistance response measured in FIG. 7, a single antenna was connected via an SMU-A connector to a vector network analyser (VNA, Pico Technologies PicoVNA 106) and the spectral response monitored as the antenna was strained. The results are shown in FIG. 8, alongside an interpolated measurement of the resonance position as a function of strain (FIG. 9).

Figure 10:
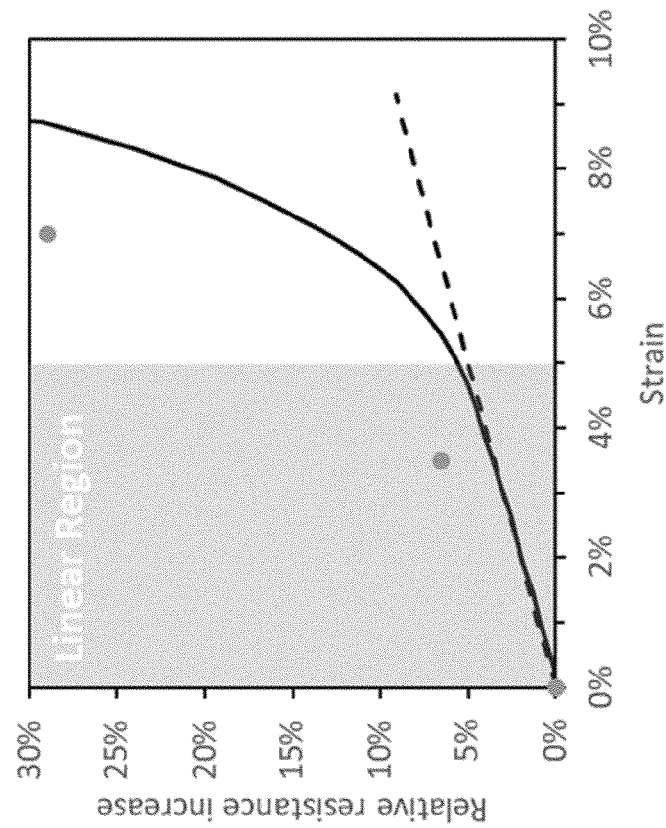
FIG. 10 shows the strain response of resistance of a printed film as described in Example 4 (see FIG. 6) with the estimated resistance for these printed films.

The data show a weak response of the antenna resonant frequency to applied strain, even beyond the region where the film conductivity is expected to behave linearly. The data may be "fitted" equally well with a constant average value of 890 MHz. By extrapolating the left-hand data in FIG. 6 to 0 Hz, it is possible to estimate the antenna resistance by:

$$R/\Omega = 50\left[\frac{1+\sqrt{10^{-S}}}{1-\sqrt{10^{-S}}}\right]$$

where S is the extrapolated value of the return loss at 0 Hz. The data are plotted in FIG. 10 alongside the data from FIG. 6. As can be seen, there is reasonable agreement between the two methods in terms of the relative change in antenna resistance with strain.

Finally, a single assembled tag (antenna and IC) was tested under cyclic loading at 5% strain, with the read range measured before and after the test. The initial read range was 70 cm, and the final read range (after 10,000 strain cycles) was also 70 cm.

Example 5: Printable Heaters

The ink of Example 2 was printed on label stock paper in the pattern shown in FIG. 11. The printing involved three print passes and the printed film had a sheet resistance of 2Ω/☐ (ohms/square). The resulting film is flexible and well-adhered to the paper substrate and conforms to a 2 mm roller diameter without flaking.

A 10V direct current potential difference was applied to the printed film (approximately 0.08A, 0.8 W), which resulted in an increase of temperature of approximately 20° C. as determined by infrared thermal imaging (see FIGS. 12A and 12B).

Example 6: Graphite-Containing Ink Formulations

It has also been found that when micron sized graphite is used instead of graphite nanoplatelets in Example 2 above, an increase in conductivity is still observed through the addition of carbon nanotubes.

Figure 13:
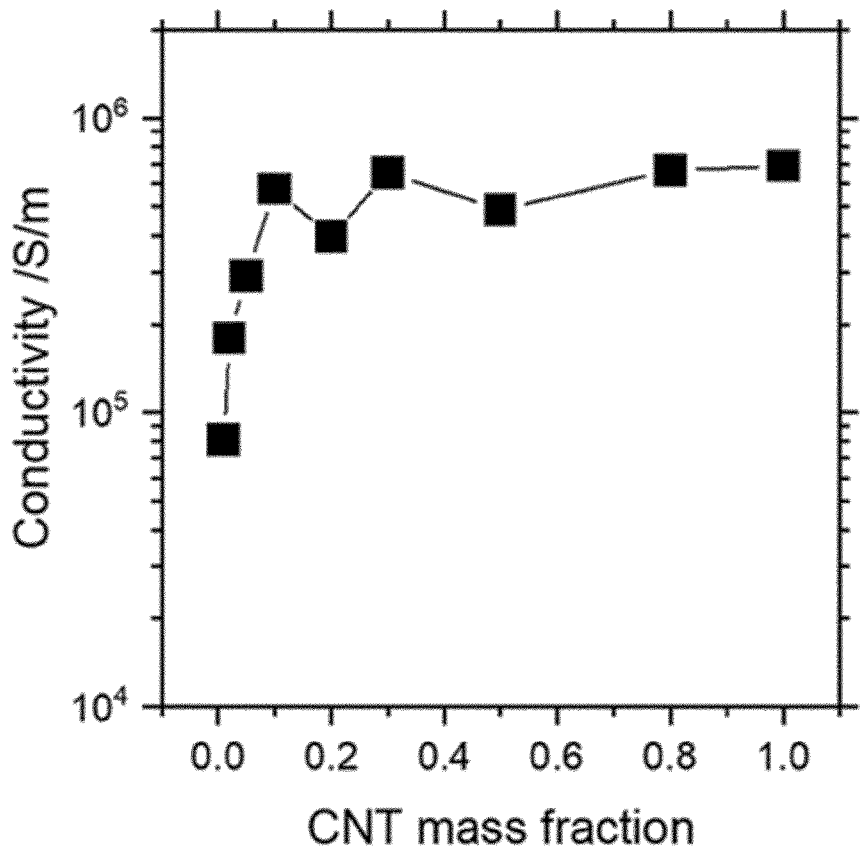
FIG. 13 shows the conductivity against the mass fraction of carbon nanotubes from films printed from inks containing graphite particles and carbon nanotubes, as described in Example 6 below.
Figure 14:
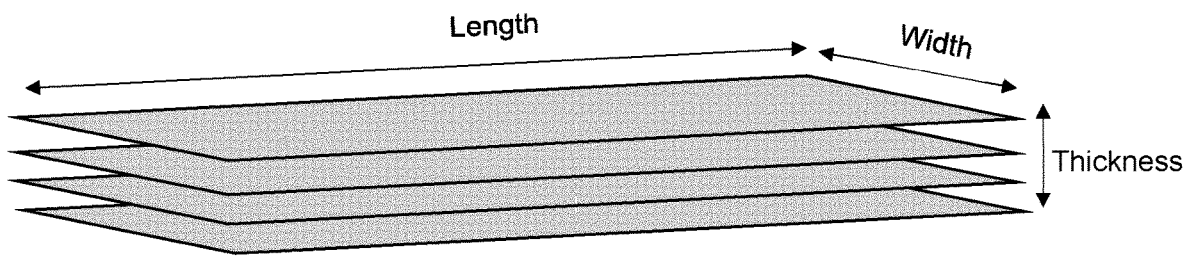
FIG. 14 is a schematic diagram showing respective width, length and thickness parameters of graphite nanoplatelets.

FIG. 13 shows the conductivity of mixtures of graphite and carbon nanotubes at different mass fractions of the carbon nanotubes.

The invention claimed is:

1. A liquid composition comprising:
   (i) graphite nanoplatelets in a weight range of 0.5% to 3% (w/w);
   (ii) carbon nanotubes in a weight range of 0.1% to 1.5% (w/w);
   (iii) a hydrogel-forming thickening agent selected from cellulose derivatives and polyvinylpyrrolidone, wherein the hydrogel-forming thickening agent is present in an amount of 0.5% to 2% by weight of the total composition;
   (iv) a surfactant in a weight range of 0.01% to 1% (w/w)
   (v) water
      wherein the graphite nanoplatelets and carbon nanotubes are present in a weight ratio of from 0.15:1 to 0.6:1 (carbon nanotubes:graphite nanoplatelets).

2. A liquid composition according to claim 1 wherein the graphite nanoplatelets have layer number of 20 or less.

3. A liquid composition according to claim 1 wherein the graphite nanoplatelets have a thickness of 30 nm or less.

4. A liquid composition according to claim 1 wherein the hydrogel-forming thickening agent is carboxymethylcellulose.

5. A liquid composition according to claim 1 wherein the carbon nanotubes are single-walled carbon nanotubes having a mean diameter of from 1 nm to 5 nm.

6. A liquid composition according to claim 1, wherein the surfactant is Triton X-100.

7. A liquid composition according to claim 1 further comprising gamma-valerolactone, in a weight of up to 5% (w/w).

8. A cellulosic substrate onto which a liquid composition according to claim 1 has been printed.

9. A liquid composition according to claim 1 wherein the graphite nanoplatelets have an average length of 100 nm or greater.

10. A liquid composition according to claim 1 wherein the carbon nanotubes have a length of greater than 3 µm.

11. A liquid composition according to claim 4, wherein the surfactant is Triton X-100.

12. A liquid composition according to claim 1, wherein the surfactant is present in a weight range of 0.01% to 0.1%.

13. An RFID tag comprising an antenna printed from a liquid composition according to claim 1 onto a substrate.

14. A printed heater comprising a heating element printed from a liquid composition according to claim 1 onto a substrate.

* * * * *